United States Patent [19]

Naruse et al.

[11] Patent Number: 4,825,770

[45] Date of Patent: May 2, 1989

[54] PALLET TRANSFER APPARATUS

[75] Inventors: Kazuo Naruse, Okazaki; Hideaki Tobita; Yoichi Shibata, both of Toyota, all of Japan

[73] Assignee: Toyota Jidosha Kabushiki Kaisha, Aichi, Japan

[21] Appl. No.: 127,085

[22] Filed: Dec. 1, 1987

[30] Foreign Application Priority Data

Jun. 8, 1987 [JP] Japan .................................. 62-142875

[51] Int. Cl.⁴ ........................ B61B 13/12; B65G 25/10
[52] U.S. Cl. ..................................... 104/162; 198/742
[58] Field of Search ...................... 104/162, 165, 172.2; 198/345, 465.1, 742, 803.01; 414/750

[56] References Cited

U.S. PATENT DOCUMENTS

| | | | |
|---|---|---|---|
| 3,417,852 | 12/1968 | Kidd | 198/742 X |
| 3,473,645 | 10/1969 | Kidd | 198/742 X |
| 3,478,859 | 11/1969 | Krempel et al. | 104/162 |
| 4,667,866 | 5/1987 | Tobita et al. | 228/4.1 |
| 4,669,607 | 6/1987 | Mason | 414/750 X |
| 4,687,091 | 8/1987 | Sticht | 198/345 |

FOREIGN PATENT DOCUMENTS 2171377  8/1986  United Kingdom ................ 198/742

Primary Examiner—Johnny D. Cherry
Assistant Examiner—Gary C. Hoge
Attorney, Agent, or Firm—Finnegan, Henderson, Farabow, Garrett & Dunner

[57] ABSTRACT

A transfer apparatus for transferring a plurality of workpieces has a pair of transfer rails along which a plurality of jig pallets each carrying a work run. A transfer bar is disposed between the pair of transfer rails so as to reciprocatingly move in the longitudinal direction of the rails. A plurality of engaging claws are disposed on the transfer bar so as to be able to pivot in planes which are perpendicular to the direction of the transfer so as to be brought into and out of engagement with the respective jig pallets by the operation of a pair of cylinder devices arranged on both sides of the transfer bar. In consequence, the jig pallets are transferred solely by linear motion of the transfer bar.

3 Claims, 5 Drawing Sheets

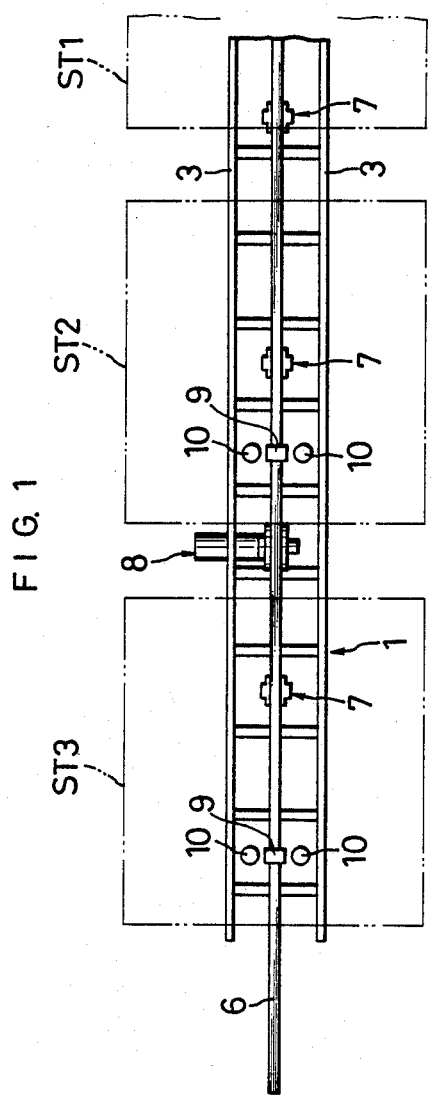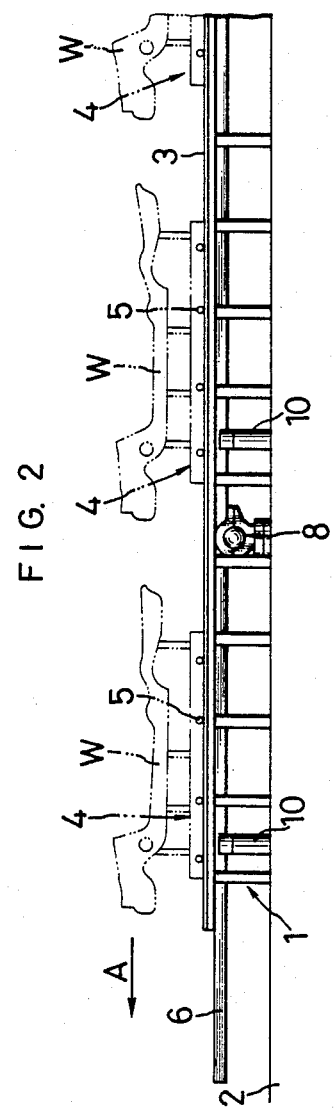

PALLET TRANSFER APPARATUS

FIELD OF THE INVENTION

The present invention relates to a transfer apparatus incorporating a transfer bar and, more particularly, to a transfer apparatus which is adapted for transferring jig pallets on which are located and mounted works.

DESCRIPTION OF THE PRIOR ART

Hitherto, assembly lines such as an automotive assembly line have been known in which works such as an under body, side body and so forth are located and mounted on jig pallets which are suitably brought into an assembly station where the assembly is conducted by making use of the jig pallets as the assembly jigs. This type of assembly line has been known from, for example, the specification of U.S. Pat. No. 4,667,866. Various types of systems are available for the purpose of transferring the jig pallets carrying these parts or works, such as shuttle-transfer system, truck transfer system, top-chain transfer system and slat conveyor system. Among these transfer systems, the shuttle transfer system has been most welcomed because this ensures a high precision in locating the jig pallets with respect to the assembly station, as well as smooth movement of the jig pallets.

In general, the transfer apparatus of the shuttle transfer system incorporates a plurality of, typically two, transfer bars which are designed to perform box-type movement including upward stroking, forward stroking, downward stroking and backward stroking. These transfer bars are adapted to carry the jig pallet so as to transfer the jig pallet to a predetermined position in the assembly station.

The transfer apparatus of the shuttle transfer type, however, suffers from a problem in that the cycle time is elongated due to the necessity of the vertical upward and downward stokes in addition to horizontal movement, resulting in a difficulty in the improvement in the production efficiency. In addition, the upward and downward vertical strokes essentially require a specific link mechanism, as well as supporting and guiding mechanisms, with the result that the size of the apparatus becomes large.

SUMMARY OF THE INVENTION

Accordingly, an object of the present invention is to provide a transfer apparatus which is capable of transferring jig pallets mounting works to an assembly station without employing any vertical component of movement, i.e., only through linear movement.

To this end, according to the present invention, there is provided a transfer apparatus comprising: a pair of transfer rails mounting a plurality of jig pallets such that the jig pallets can run along these rails, each of the jig pallets carrying a work to be processed; a transfer bar disposed between and extending along the pair of transfer rails in such a manner as to be movable reciprocatingly along the transfer rails; an engaging claw provided on the transfer bar and pivotable within a plane perpendicular to the transfer bar between an engaging position where it engages with the jig pallet and a disengaged position where it is out of engagement with the jig pallet; and a pair of cylinder devices disposed on both sides of the transfer bar and adapted to cause pivoting motion of the engaging claw so as to set the engaging claw selectively either at the engaging position or the disengaged position.

The transfer apparatus of the described embodiment can have a plurality of sets of the engaging claws and the cylinder device arranged in the longitudinal direction of the transfer bar. Preferably, these sets are disposed at a pitch which corresponds to the pitch of the assembly stations or working stations along the production line.

In the apparatus of the present invention, the transfer bar and the jig pallet can be brought into and out of engagement with each other by suitably pivoting the engaging claw by the action of the associated cylinder device, whereby the jig pallet can be transferred solely by the linear movement of the transfer bars. Since the movement of the transfer bars does not include any vertical stroke component, the cycle time is shortened so as to ensure a higher production efficiency. In addition, since the movement of the transfer bars is simplified, the construction of the apparatus is simplified and the installation cost is reduced advantageously.

BRIEF DESCRIPTION OF THE DRAWINGS

FIGS. 1 and 2 are a plan view and a side elevational view of the whole of a transfer apparatus in accordance with the present invention;

DESCRIPTION OF THE PREFERRED EMBODIMENT

Figure 3:
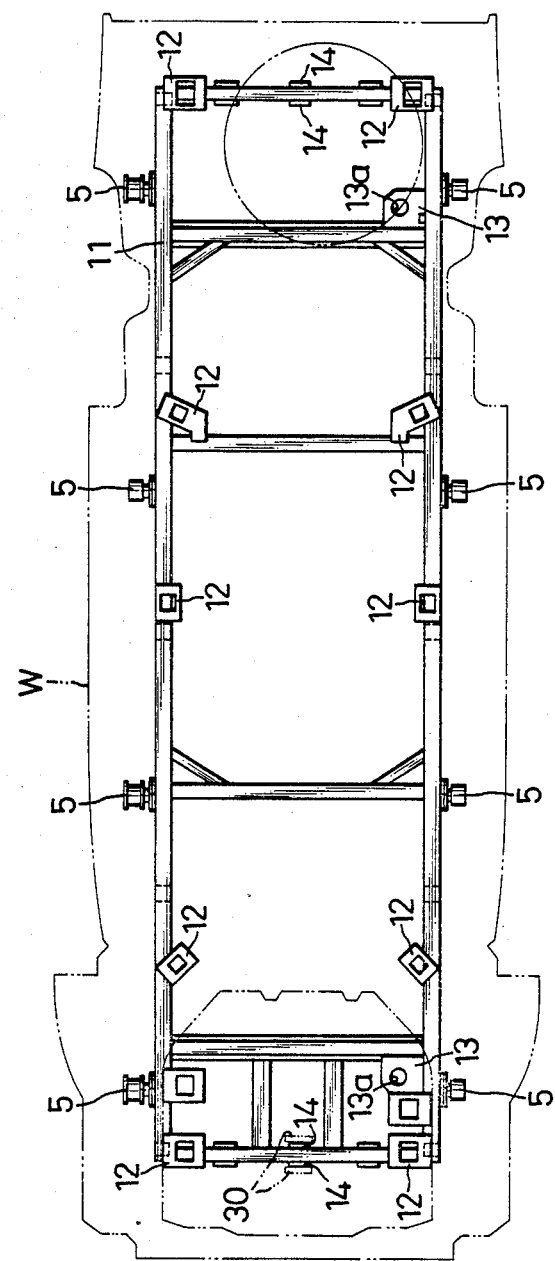
FIG. 3 is a plan view of a jig pallet which is adapted to be transferred by a transfer apparatus of the present invention.

A preferred embodiment of the present invention will be described hereinunder with reference to the accompanying drawings.

Referring first to FIGS. 1 and 2, a pair of transfer rails 3, 3 are laid on a plurality of columns 1 which are disposed on a floor 2 along an assembly line. The rails 3, 3 are arranged at both sides of the assembly line. A jig pallet 4 is adapted to run along the rails 3,3 by means of wheels 5. A work piece w, which is in this case an under body of an automobile, is located on and carried by the jig pallet 4. Either the transfer rails 3 or the associated wheels 5 on the jig pallet have V-shaped surfaces which mate flat surfaces of the wheels 5 or the rails 3 so as to ensure that the jig pallet 4 can stably run along the rails 3, 3. A transfer bar 6 made of a tubular member having a substantially rectangular cross-section is laid along the assembly line in parallel with the transfer rails 3 at a position between the rails 3, 3. The transfer bar 6 is supported by a plurality of supporting guides 7 so as to be able to move linearly and is adapted to be reciprocatingly driven along the rails by the power of a driving source 8. A plurality of sets of disengageable coupling means, constituted by an engaging device 9 and a pair of cylinder devices 10, are arranged on the transfer bar 6 and the floor at both sides of the transfer bar 6, for the purpose of disengageably coupling the jig pallets 4 to the transfer bar 6. The arrangement is such that the coupling means selectively couples the jig pallets 4 to the transfer bar so that the jig pallets 4 are adapted to be moved along the transfer rails 3 following the movement of the transfer bar 6.

The assembly line has a plurality of assembly stations ST1, ST2 and ST3 having various devices such as a welding robot and locating devices. The jig pallets 4, as well as coupling means 9,10, are arranged at a pitch or interval corresponding to the pitch of the assembly stations ST1, ST2 and ST3. According to this arrangement, the jig pallets 4 are capable of moving in the direction of the arrow A along the transfer rails 3 by the operation of the coupling means, so as to be successively stationed in the assembly stations ST1, ST2 and ST3.

As shown in FIG. 3, the jig pallet 4 has a standard-shaped frame 11 commonly adaptable to a variety of types and models of automobile, and a plurality of reference members 12, 12 disposed on the frame 11, each of these reference members is adaptable to each specific type or model of the automobile. The frame 11 also carries a clamp device (not shown). The arrangement is such that the under body w can be located and mounted on the reference member 12. The jig pallet 4 also has a locating block 13 which is provided on the front and rear side thereof with reference holes 13a. The locating block 13 is adapted to be located with each assembly station ST1, ST2 or ST3 as the locating pins provided on the work stations as locating pins (not shown) provided in each of the assembly stations ST1, ST2 and ST3 are received in the reference holes 13a. The jig pallet 4 is further provided with abutting plates 14, 14 on the front and rear ends of the frame 11. The abutting plate 14 is adapted to be contacted at its both surfaces with later-mentioned claws 30 of the engaging device 9 so as to limit any relative movement between the jig pallet 4 and the transfer bar 6 in the direction of the transfer.

Figure 4:
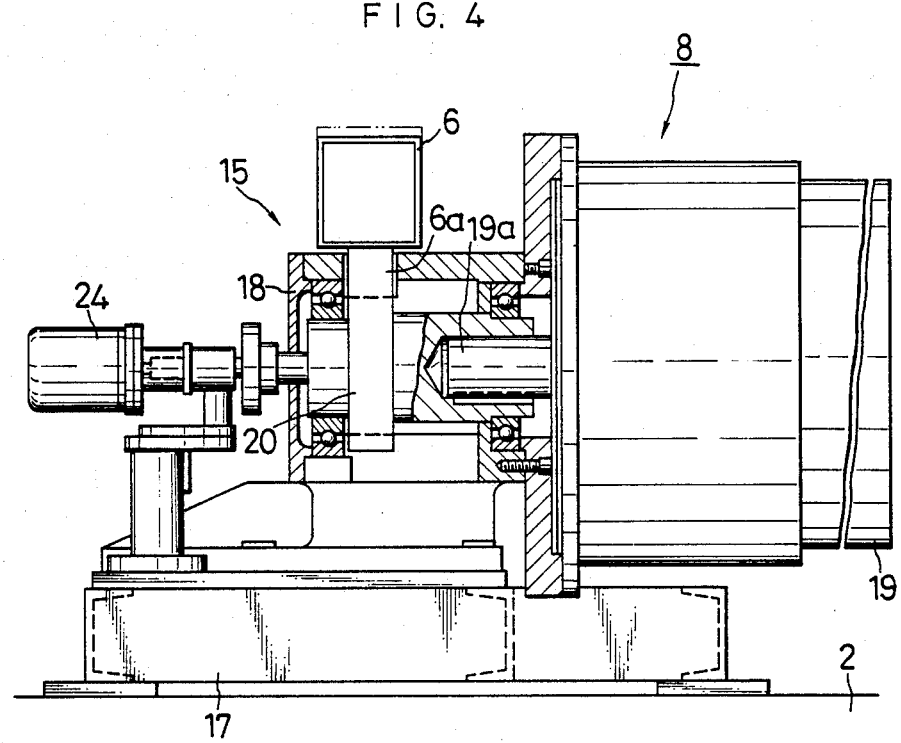
FIG. 4 is a sectional view of a driving portion of the transfer apparatus in accordance with the present invention.
Figure 5:
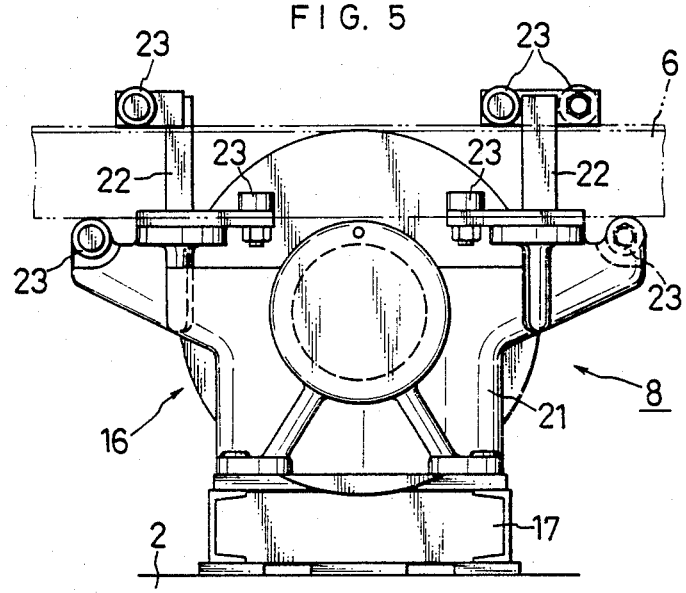
FIG. 5 is a front elevational view of the driving portion.
Figure 6:
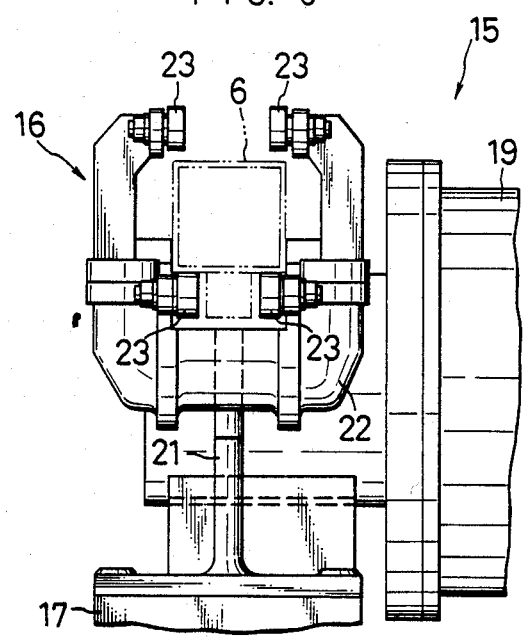
FIG. 6 is a side elevational view of the driving portion.

As will be also seen from FIGS. 4 to 6, the driving source 8 is mainly constituted by a driving portion 15 for driving the transfer bar 6 and a supporting portion 16 for supporting and guiding the transfer bar 6. The driving portion 15 includes a base 17 fixed to the floor 2, a housing 18 mounted on the base 17, a drive motor 19 connected to one end of the housing 18, a pinion 20 integrally fixed to the output shaft 19a of the drive motor 19 within the housing 18, and a rack 6a integral with the transfer bar 6 and meshing with the pinion 20. On the other hand, the supporting portion 16 has brackets 22, 22 provided on the front and rear sides of supporting posts 21 standing upright from the base 17, and a plurality of cam followers 23, 23 provided on the bracket 22 and engaging with the upper, lower and lateral sides of the transfer bar 6. The arrangement is such that the operation of the driving motor 19 is converted into a linear motion of the transfer bar 6 through the rack and pinion mechanism 20, 6a so that the transfer bar 6 makes a linear movement while being guided by the cam follower 23. The distance travelled by the transfer bar 6 is detected by a tachogenerator 24 provided in the driving section 15.

Figure 7:
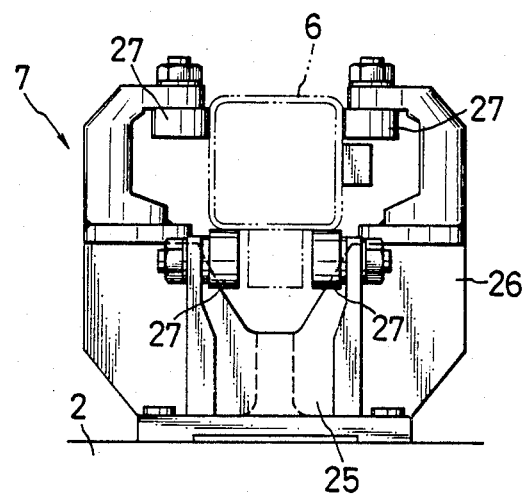
FIG. 7 is a side elevational view of a supporting guide for transfer bars incorporated in the transfer apparatus of the invention.

The supporting guide 7 also has a construction which is substantially the same as that of the supporting portion 16 of the driving source 8. More specifically, as shown in FIG. 7, the supporting guide 7 has a plurality of cam followers 27, 27 attached through brackets 26 to supporting posts 25 standing upright from the floor 2. These cam followers 27 make sliding contact with the lower surface and the lateral surfaces of the transfer bar 6 such as to ensure smooth movement of the transfer bar 6.

Figure 8:
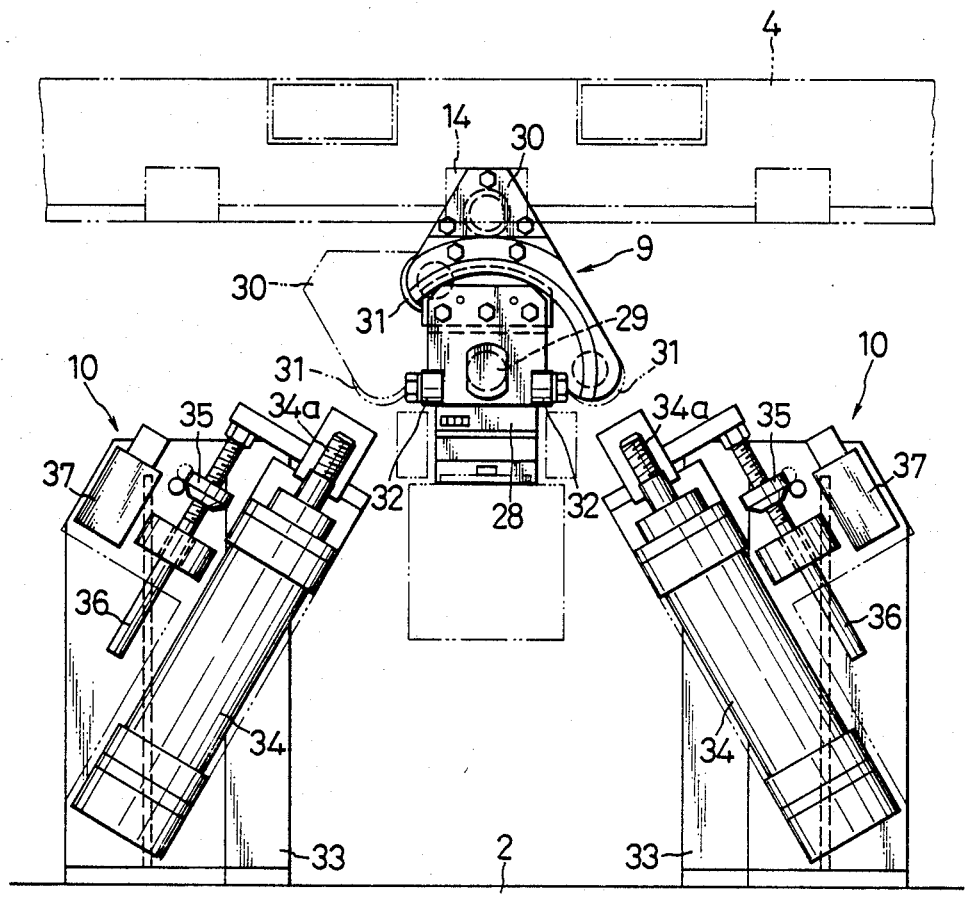
FIG. 8 is a side elevational view of coupling means for coupling the transfer bar and the jig pallet.

Referring now to FIG. 8, the engaging device 9 which constitutes a part of the means of coupling between the transfer bar 6 and the jig pallet 4 includes a supporting block 28 fixed to the transfer bar 6, an engaging claw 30 secured to the supporting block by means of a shaft 29 so as to be able to pivot within a plane which is perpendicular to the transfer bar 6, and a pair of stoppers 32, 32 adapted for engaging with cam followers 31, 31 provided on the engaging claw 30 so as to limit counterclockwise and clockwise pivotal movement of the engaging claw 30. The engaging claw 30 has a bifurcated end so as to be able to clamp the abutting plate 14 on the jig pallet 4, and is pivotable between a position (solid-line position) where it engages with the abutting plate 14 and a disengaged position (broken-line position) where it is out of engagement with the abutting plate 14. When the engaging claw 30 is in the engaging position where it engages with the abutting plate 14, the transfer bar 6 and the jig pallet 4 are mutually interfered in the direction of the transfer, so that they are moved as a unit with each other.

The cylinder devices 10,10 which also constitute a part of the coupling means, have supporting posts 33, 33 provided on the floor 2 at both sides of the transfer bar 6, cylinders 34, 34 mounted on the posts 33, 33 at inclination, dog shafts 36 integral with the output shafts 34a, 34a of the cylinders 34, 34 and provided with intermediate dogs 35, 35, and limit switches 37, 37 engageable with the dogs 35, 35 so as to detect extending and retracting motion of the cylinders 34, 34. Usually, the output shafts 34a, 34a of the cylinders 34, 34 are set at the retracted positions as shown. These cylinders 34 and 34 operate alternatingly so as to extend and retract their output shafts 34a, 34a, so that the engaging claw 30 is selectively set in either one of the two positions mentioned before, whereby the transfer bar 6 and the jig pallet 4 are selectively and detachably coupled to each other. Signals from the limit switches 37, 37 and the signal from the tachogenerator 24 of the driving source 8 are sent to a separately mounted programmable controller PC, and the transfer device of the present invention is generally controlled by the programmable controller PC.

A plurality of jig pallets 4, each carrying a piece of under body w located thereon, are fed onto the transfer rails 3 and one of the cylinders 34 in each of the engaging devices 9 is activated to bring the associated engaging claw 30 into engagement with the abutting plate 14 of the jig pallet 4, whereby each jig pallet 4 is brought into engagement with the transfer bar 6. Then, as the transfer bar 6 is moved forward by the operation of the driving motor 19, the jig pallets 4 are tracted by the transfer bar 6 so as to move along the transfer rails 3 so as to be brought into the respective assembly stations ST1, ST2 and ST3. More specifically, cylinder devices 10, 10 corresponding to the respective assembly stations ST1, ST2 and ST3 are activated so that the jig pallets 4, 4 are brought into the respective assembly stations (see FIGS. 1 and 2).

The forward movement of the transfer bar 6 is stopped when the jig pallets 4, 4 have been set in right positions in the respective assembly stations ST1, ST2 and ST3. Subsequently, the engaging claws 30 are reversed by the operation of the other cylinders 34 so as to disconnect the jig plates 4 from the transfer bar 6. Immediately after the disconnection, the driving motor 19 operates to reverse only the transfer bar 6 to the initial position. Meanwhile, in each of the assembly stations ST1, ST2 and ST3, locating pins are inserted into holes in the locating block 13 so as to locate and fix the jig pallet 4 with respect to the assembly station, thereby enabling the necessary assembly operation such as welding by a robot to be conducted on the work carried by the jig pallet 4. After the completion of the assembly operations in the respective assembly stations, the cylinders 34 in the respective engaging devices are activated and the driving motor 19 is re-started so that the jig pallets 4 are transported into the next assembly stations ST1, ST2 and ST3. The described operations are repeated so that each work piece w, which is a piece of under body in this embodiment, undergoes a series of assembly operations.

In the described embodiments, a coupling means 9, 10 is provided for each of the assembly stations ST1, ST2 and ST3, so as to selectively couple the jig pallet to the transfer bar 6, so that the transfer of the jig pallets 4 can be conducted only between the assembly stations which require such transfer of works. For instance, the assembly line can operate satisfactorily even when one of the jig pallets is omitted from the train of the jig pallets.

What is claimed is:

1. A transfer apparatus for a plurality of jig pallets having a frame portion extending transverse the direction of transfer, said apparatus comprising:
   a pair of elongated rails for movably supporting the plurality of jig pallets thereon;
   a transfer bar extending substantially parallel to the elongated rails and movable reciprocably along the rails;
   engaging claw means mounted on the transfer bar pivotable relative to the bar between a first position for engaging and a second position for disengaging the frame portion of the pallet, and;
   a pair of cylinder devices each being disposed on opposite sides of the transfer bar, one of said devices being operable to pivot the claw from the first position to the second position and the other being operable to pivot the claw from the second position to the first position.

2. A transfer apparatus according to claim 1 wherein the engaging claw means includes a plurality of longitudinally spaced engaging claws on the transfer bar.

3. A transfer apparatus according to claim 1 wherein the plurality of engaging claws are spaced from each other a predetermined distance corresponding to the distance between each of a plurality of spaced work stations of a production line.

* * * * *